(12) United States Patent
Mehra et al.

(10) Patent No.: US 10,585,588 B2
(45) Date of Patent: Mar. 10, 2020

(54) VIRTUAL STORAGE FREE SPACE MANAGEMENT

(71) Applicant: MICROSOFT TECHNOLOGY LICENSING, LLC, Redmond, WA (US)

(72) Inventors: Karan Mehra, Sammamish, WA (US); Neal R. Christiansen, Bellevue, WA (US); Emanuel Paleologu, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 6 days.

(21) Appl. No.: 15/847,797

(22) Filed: Dec. 19, 2017

(65) Prior Publication Data

US 2019/0146678 A1 May 16, 2019

Related U.S. Application Data

(60) Provisional application No. 62/586,823, filed on Nov. 15, 2017.

(51) Int. Cl.
*G06F 3/06* (2006.01)
*G06F 9/54* (2006.01)

(52) U.S. Cl.
CPC ............ *G06F 3/0608* (2013.01); *G06F 3/067* (2013.01); *G06F 3/0631* (2013.01); *G06F 3/0638* (2013.01); *G06F 3/0665* (2013.01); *G06F 9/54* (2013.01)

(58) Field of Classification Search
CPC .... G06F 3/0608; G06F 3/0631; G06F 3/0638; G06F 3/0665; G06F 3/067
See application file for complete search history.

(56) References Cited

U.S. PATENT DOCUMENTS

| | | | | |
|---|---|---|---|---|
| 9,110,599 | B1 * | 8/2015 | Fair | G06F 3/0644 |
| 2005/0010932 | A1 * | 1/2005 | Kohno | G06F 8/656 |
| | | | | 719/328 |
| 2006/0101204 | A1 * | 5/2006 | Bao | G06F 3/0605 |
| | | | | 711/114 |
| 2011/0208913 | A1 * | 8/2011 | Suzuki | G06F 1/266 |
| | | | | 711/115 |
| 2013/0238780 | A1 * | 9/2013 | Devarakonda | G06F 9/5072 |
| | | | | 709/224 |

(Continued)

OTHER PUBLICATIONS

International Search Report and Written Opinion Issued in PCT Application No. PCT/US2018/059126, dated Jan. 2, 2019, 10 Pages.

*Primary Examiner* — Tracy A Warren
(74) *Attorney, Agent, or Firm* — Newport IP, LLC; Benjamin A. Keim

(57) ABSTRACT

Virtual storage free space management techniques may calculate a data allocation value of a virtual storage entity based on a number of storage slabs allocated with data. The virtual storage free space management techniques may further analyze a physical storage entity to determine a storage allocation value associated with the physical storage entity. The storage allocation value may be obtained by summing the storage amount in bytes associated with each of the storage slabs of the physical storage entity that is allocated to one or more virtual storage entities. A free space value associated with the virtual storage entity may be determined based on the storage allocation value and the data allocation value.

20 Claims, 5 Drawing Sheets

(56) References Cited

U.S. PATENT DOCUMENTS

| | | |
|---|---|---|
| 2014/0164730 A1 | 6/2014 | Gold et al. |
| 2014/0229701 A1* | 8/2014 | Jaquet .................. G06F 12/0238 711/171 |
| 2014/0297987 A1* | 10/2014 | Garson ................. G06F 12/023 711/170 |
| 2017/0220261 A1 | 8/2017 | Krishnamurthy et al. |
| 2018/0004437 A1* | 1/2018 | Battaje .................. G06F 3/0619 |

* cited by examiner

VIRTUAL STORAGE FREE SPACE MANAGEMENT

PRIORITY INFORMATION

This application claims the benefit of U.S. Provisional Patent Application No. 62/586,823, filed Nov. 15, 2017 and entitled "VIRTUAL STORAGE FREE SPACE MANAGEMENT," which is expressly incorporated herein by reference in its entirety.

BACKGROUND

Generally, computing systems include some type of data storage and typically, many different types of data storage. For example, a computing system may include a solid-state storage and a hard drive or a set of hard drives. These different storage devices may each have storage partitions, or logical allocations of storage. Storage partitions are typically established at the time the associated storage device is initially used or configured. Thereafter, it may be difficult to rearrange or resize partitions associated with the storage device. As such, larger than necessary partition sizes may be chosen initially, resulting in wasted space on the associated storage device.

The use of virtual disks or virtual storage may mitigate against wasted and/or unutilized space on storage devices. One type of virtual disk technology or virtual storage technology is known as thin provisioning. Thin provisioning offers a different approach to storage provisioning. For example, a storage controller may allocate capacity to the thin provisioned storage volume as an application writes data over time, not upfront at the time of storage volume creation. In other words, thin provisioning enables on demand allocation of storage, rather than the upfront allocation of storage that is typically needed when a physical storage medium if first initialized. Therefore, thin provisioning may reduce unused storage space and improve storage utilization. For example, with thin provisioning, storage capacity utilization efficiency can be improved, while incurring little administrative overhead. Thus, thin provisioning may enable organizations to delay storage purchases and save on environmental costs.

While thin provisioning may significantly improve storage utilization, it may be difficult to accurately calculate free space (i.e., storage available for applications and their files) across a plurality of thin provisioned storage entities or virtual disks. For example, a plurality of thin provisioned storage entities may be allocated to a solid-state storage and a hard drive or set of hard drives. In conventional systems, each of the plurality of thin provisioned storage entities tracks its own free space. However, those thin provisioned storage entities do not generally share their free space with other thin provisioned storage entities or virtual disks. Therefore, free space determined by thin provisioned storage entities or virtual disks may not properly reflect the actual free space of the physical storage(s) hosting the thin provisioned storage entities or virtual disks.

It is with respect to these considerations and others that the disclosure made herein is presented.

SUMMARY

This disclosure describes virtual storage free space management techniques that may be used to determine an amount of free space that is associated with at least one virtual storage entity. In this disclosure, the free space that is associated with at least the one virtual storage entity is unused space that the virtual storage entity has allocated for storage of files and other data. In some implementations, the virtual storage free space management techniques are enabled by a free space application programming interface (API) that is responsive to requests to determine free space associated with at least the one virtual storage entity.

In some implementations, the virtual storage free space management techniques may analyze at least one virtual storage entity to determine the number of storage slabs associated with the virtual storage entity that are allocated with data. In this disclosure, a storage slab is a quantum of storage space. For example, in some implementations, a storage slab is 64 MB, 256 MB, or 1 GB. A virtual storage entity is allocated with a plurality of storage slabs, where those plurality of storage slabs may be associated with a physical storage entity. The physical storage entity may comprise one or more physical storage devices, such as solid-state drives, hard drives, and the like.

The virtual storage free space management techniques may calculate a data allocation value of the virtual storage entity based on the number of storage slabs allocated with data. The data allocation value is a byte value that is determined by identifying the storage slabs of the virtual storage entity that include stored data, and summing the storage amount in bytes associated with each of the storage slabs that include stored data.

The virtual storage free space management techniques may further analyze a physical storage entity to determine a storage allocation value associated with the physical storage entity. The determined storage allocation value may represent a byte value that is determined by identifying storage slabs of the physical storage entity that are allocated to one or more virtual storage entities. More specifically, the storage allocation value may be a byte value that is obtained by summing the storage amount in bytes associated with each of the storage slabs of the physical storage entity that is allocated to one or more virtual storage entities.

In some implementations, the virtual storage free space management techniques may determine a free space value associated with the virtual storage entity based on the storage allocation value and the data allocation value.

In some implementations, the data allocation value is calculated by analyzing a free space bitmap associated with the storage slabs allocated with data, the analyzing of the free space bitmap providing an amount of free space associated with the storage slabs allocated with data. Furthermore, in some implementations, the data allocation value is calculated by determining a storage value associated with the number of storage slabs allocated with data and subtracting the amount of free space associated with at least the number of one or more storage slabs allocated with data from the storage value.

It should be appreciated that, although described in relation to a system, the above-described subject matter may also be implemented as a computer-controlled apparatus, a computer process, a computing system, or as an article of manufacture such as a computer-readable medium and/or dedicated chipset. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter or a sequence of letters to refer to each individual item. Generic references to the items may use the specific reference number without the sequence of letters. Furthermore, it is to be understood that referencing an item in the drawings and/or in this text using a reference number or otherwise may denote one or more such referenced items.

DETAILED DESCRIPTION

Figure 1:
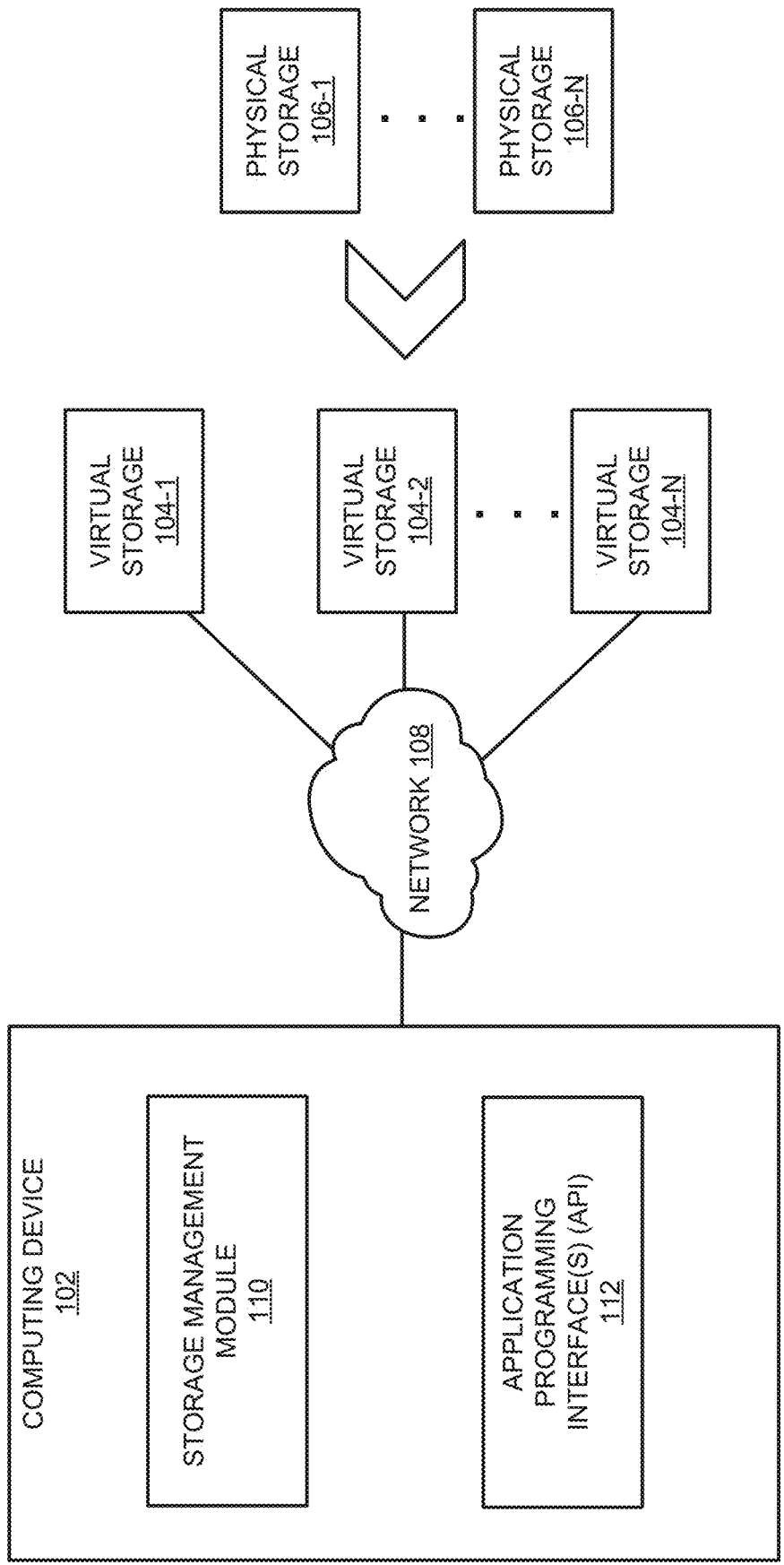
FIG. 1 illustrates an exemplary computing environment. The virtual storage space management techniques described herein may be implemented buy the computing environment.

This disclosure describes virtual storage free space management techniques that may be used to determine an amount of free space that is associated with at least one virtual storage entity. In this disclosure, the free space that is associated with at least the one virtual storage entity is unused space that the virtual storage entity has allocated for storage of files and other data. In some implementations, the virtual storage free space management techniques are enabled by a free space application programming interface (API) that is responsive to requests to determine free space associated with at least the one virtual storage entity.

In some implementations, the virtual storage free space management techniques may analyze at least one virtual storage entity to determine the number of storage slabs associated with the virtual storage entity that are allocated with data. In this disclosure, a storage slab is a quantum of storage space. For example, in some implementations, a storage slab is 64 MB, 256 MB, or 1 GB. A virtual storage entity is allocated with a plurality of storage slabs, where those plurality of storage slabs may be associated with a physical storage entity. The physical storage entity may comprise one or more physical storage devices, such as solid-state drives, hard drives, and the like.

The virtual storage free space management techniques may calculate a data allocation value of the virtual storage entity based on the number of storage slabs allocated with data. The data allocation value is a byte value that is determined by identifying the storage slabs of the virtual storage entity that include stored data, and summing the storage amount in bytes associated with each of the storage slabs that include stored data.

The virtual storage free space management techniques may further analyze a physical storage entity to determine a storage allocation value associated with the physical storage entity. The determined storage allocation value may represent a byte value that is determined by identifying storage slabs of the physical storage entity that are allocated to one or more virtual storage entities. More specifically, the storage allocation value may be a byte value that is obtained by summing the storage amount in bytes associated with each of the storage slabs of the physical storage entity that is allocated to one or more virtual storage entities.

In some implementations, the virtual storage free space management techniques may determine a free space value associated with the virtual storage entity based on the storage allocation value and the data allocation value.

In some implementations, the data allocation value is calculated by analyzing a free space bitmap associated with the storage slabs allocated with data, the analyzing of the free space bitmap providing an amount of free space associated with the storage slabs allocated with data. Furthermore, in some implementations, the data allocation value is calculated by determining a storage value associated with the number of storage slabs allocated with data and subtracting the amount of free space associated with at least the number of one or more storage slabs allocated with data from the storage value.

FIG. 1 illustrates an exemplary computing environment 100. The virtual storage space management techniques described herein may be implemented buy the computing environment 100.

As illustrated, the computing environment 100 may include a computing device 102. The computing device 102 may be coupled to a plurality of virtual storage entities 104-1 . . . 104-n through a network 108. The plurality of virtual storage entities 104-1 . . . 104-n may be collectively referred to as virtual storage entities 104, and individually each of the plurality of virtual storage entities 104-1 . . . 104-n may be referred to as a virtual storage entity 104. The virtual storage entities 104 may be coupled to a plurality of physical storage entities 106-1 . . . 106-n. The plurality of physical storage entities 106-1 . . . 106-n may be collectively referred to as physical storage entities 106, and individually each of the plurality of physical storage entities 106-1 . . . 106-n may be referred to as a physical storage entity 106.

The computing device 102 may be any computing device, such as, a personal computer, a workstation, a server, a mainframe, a handheld computer, a palmtop computer, a telephony device, network appliance, a blade computer, a server, etc. The physical storage entities 106 may be any suitable storage devices, such as hard disks, solid-state disks, linear storage devices, etc. The computing device 102 and the physical storage entities 106 may communicate over the network 108. The network 108 may include any suitable network, such as the Internet, a storage area network, a wide area network, a local area network, etc. In some implementations, the computing environment 100 may be implemented in a cloud computing environment, and the computing environment 100, may provide processing and storage services to users, enterprise entities, etc.

The computing device 102 may include a storage management module 110. The storage management module 110 may function to manage the physical storage entities 106. For example, the storage management module 110 may be controlled to provision the virtual storage entities 104. In some implementations, the physical storage entities 106 each comprise data storage capability that is divided into chunks of bytes. These chunks of bytes are also known as storage slabs. Each of the physical storage entities 106 may have a plurality of storage slabs, where each of the plurality of storage slabs is 64 MB, 256 MB, 1 GB, or the like. The storage management module 110 may be controlled to allocate storage slabs of one or more of the physical storage entities 106 to one or more the virtual storage entities 104. One or more application programming interfaces (API) 112 may provide an interface to the storage management module 110 in order to enable provisioning of the virtual storage entities 104. Furthermore, as described hereinafter, the one or more APIs 112 may be used to determine free space associated with at least one of the virtual storage entities 104.

The virtual storage entities 104 may comprise thin provisioned storage volumes. These thin provisioned storage volumes save storage space when storage space is potentially or temporarily needed. Without the use of thin provisioned storage volumes, target storage volumes consume the same physical capacity as source storage volumes, such as the physical storage entities 106. When a normal storage volume is created, it occupies the defined capacity on the physical drives. Thin provisioned storage volumes do not occupy physical capacity when they are initially created. Therefore, an administrator can initially provision less storage capacity, which can help lower the amount of physical storage that is needed by many installations.

Figure 2:
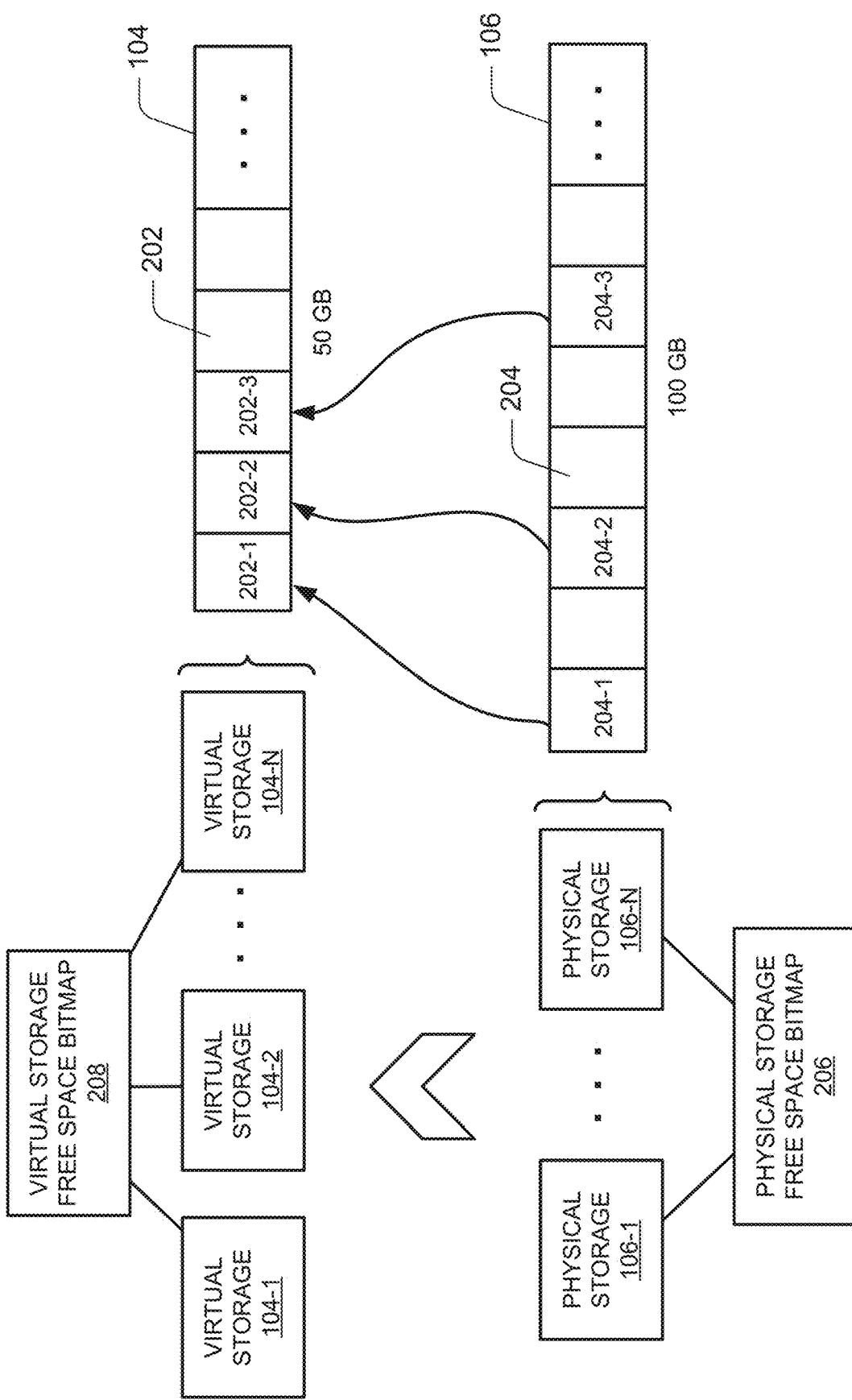
FIG. 2 illustrates an enhanced view of at least one virtual storage entity and at least one physical storage entity of the computing environment.

FIG. 2 illustrates an enhanced view of at least one virtual storage entity 104 and at least one physical storage entity 106 of the computing environment 100. The enhanced view of the virtual storage entity 104 shows that the virtual storage entity 104 may include a plurality of storage slabs 202. Furthermore, the enhanced view of the physical storage entity 106 shows that the physical storage entity 106 may include a plurality of storage slabs 204. In the exemplary embodiment of the computing environment 100 illustrated in FIG. 2, the virtual storage entity 104 may have an allocated maximum capacity of 50 GB. The allocated maximum capacity of 50 GB may be configured by the storage management module 110. Furthermore, in the exemplary embodiment of the computing environment 100 illustrated in FIG. 2, the physical storage entity 106 may have a fixed storage capability of 100 GB. The storage capabilities of the virtual storage entities 104 and the physical storage entities 106 described herein are exemplary. Specifically, the virtual storage entities 104 and the physical storage entities 106 may be implemented and deployed having any storage capability, as required by use scenarios associated with the computing environment 100.

Each of the virtual storage entities 104 may be virtually provisioned by one or more of the physical Storages 106. For example, as illustrated in FIG. 2, the enhanced views of the virtual storage entity 104 and physical storage entity 106 show that the storage slab 202-1 may be allocated to the storage slab 204-1, the storage slab 202-2 may be allocated to the storage slab 204-2 and the storage slab 202-3 may be allocated to the storage slab 204-3. The virtual storage entity 104 may have additional storage slabs 202 allocated by other physical storage entities 106. Furthermore, one or more of the physical entities 106 may allocate additional storage slabs 204 to one or more of the virtual storage entities 104. Each of the storage slabs 202 and 204 may have an associated byte value. For example, one or more the storage slabs 202 and/or 204 may have a byte value of 64 MB, 256 MB, 1 GB, etc.

A virtual storage free space bitmap 208 may be used in the computing environment 100. As illustrated, the virtual storage free space bitmap 208 may be coupled to the virtual storage entities 104. Operationally, the virtual storage free space bitmap 208 tracks the free space in each of the slabs 202 associated with the virtual storage entities 104. For example, the virtual storage free space bitmap 208 may comprise a plurality of bits. Each of the plurality bits may correspond to a storage cluster in one of the storage slabs 202. Each of the storage slabs 202 may comprise a plurality of storage clusters. A value of each bit of the plurality bits associated with the free space bitmap 208 represents whether the corresponding storage cluster has been allocated with data or is free. For example, one bit value (e.g., 0, logical false) may represent that the corresponding storage cluster is free, and a different bit value (e.g., 1, non-zero, logical true) may represent that the corresponding storage cluster is allocated. Therefore, the virtual storage free space bitmap 208 enables the storage management module 110 to at least ascertain the amount of free space within each of the storage slabs 202, on a storage cluster to storage cluster basis. In some embodiments, the virtual storage free space bitmap 208 is stored in a persistent memory associated with the computing environment 100.

The virtual storage free space bitmap 208 tracks each of the storage slabs 202. For example, the virtual storage free space bitmap 208 may track the storage slabs 202 that are allocated with data. Furthermore, the virtual storage free space bitmap 208 may track the storage slabs 202 that are not allocated with data (i.e., free storage slabs). In some implementations, bits associated with the virtual storage free space bitmap 208 are used to represent whether a corresponding storage slab has been allocated with data or is free. For example, one bit value (e.g., 0, logical false) may represent that the corresponding storage slab is free, and a different bit value (e.g., 1, non-zero, logical true) may represent that the corresponding storage slab is allocated. Therefore, the virtual storage free space bitmap 208 enables the storage management module 110 to at least ascertain which storage slabs 202 are allocated with data and which storage slabs 202 are free of data.

In some implementations, the virtual storage free space bitmap 208 comprises two distinct bitmaps. Specifically, a first bitmap tracks the free space in each of the storage slabs 202 associated with the virtual storage entities 104, and a second bitmap tracks the storage slabs 202 that are allocated with data and those that are free of data.

Additionally, a physical storage free space bitmap 206 may be used in the computing environment 100. As illustrated, the physical storage free space bitmap 206 may be coupled to the physical storage entities 106. Operationally, the physical storage free space bitmap 206 tracks the storage slabs 204 associated with the physical storage entities 106 that are not allocated to one or more of the virtual storage entities 104. For example, the physical storage free space bitmap 206 may comprise a plurality bits. Each of the plurality bits may correspond to a storage slab 204 associated with a corresponding physical storage entity 106. A value of each bit of the plurality bits associated with the physical storage free space bitmap 206 represents whether the corresponding storage slab 204 is allocated to a virtual storage entity 104. For example, one bit value (e.g., 0, logical false) may represent that the corresponding storage slab 204 is free, and a different bit value (e.g., 1, non-zero, logical true) may represent that the corresponding storage slab 204 is allocated. Therefore, the physical storage free space bitmap 206 enables the storage management module 110 to at least ascertain which storage slabs 204 are not allocated to one or more of the virtual storages 104. In some embodiments, the physical storage free space bitmap 206 is stored in a memory associated with the computing environment 100.

Figure 3:
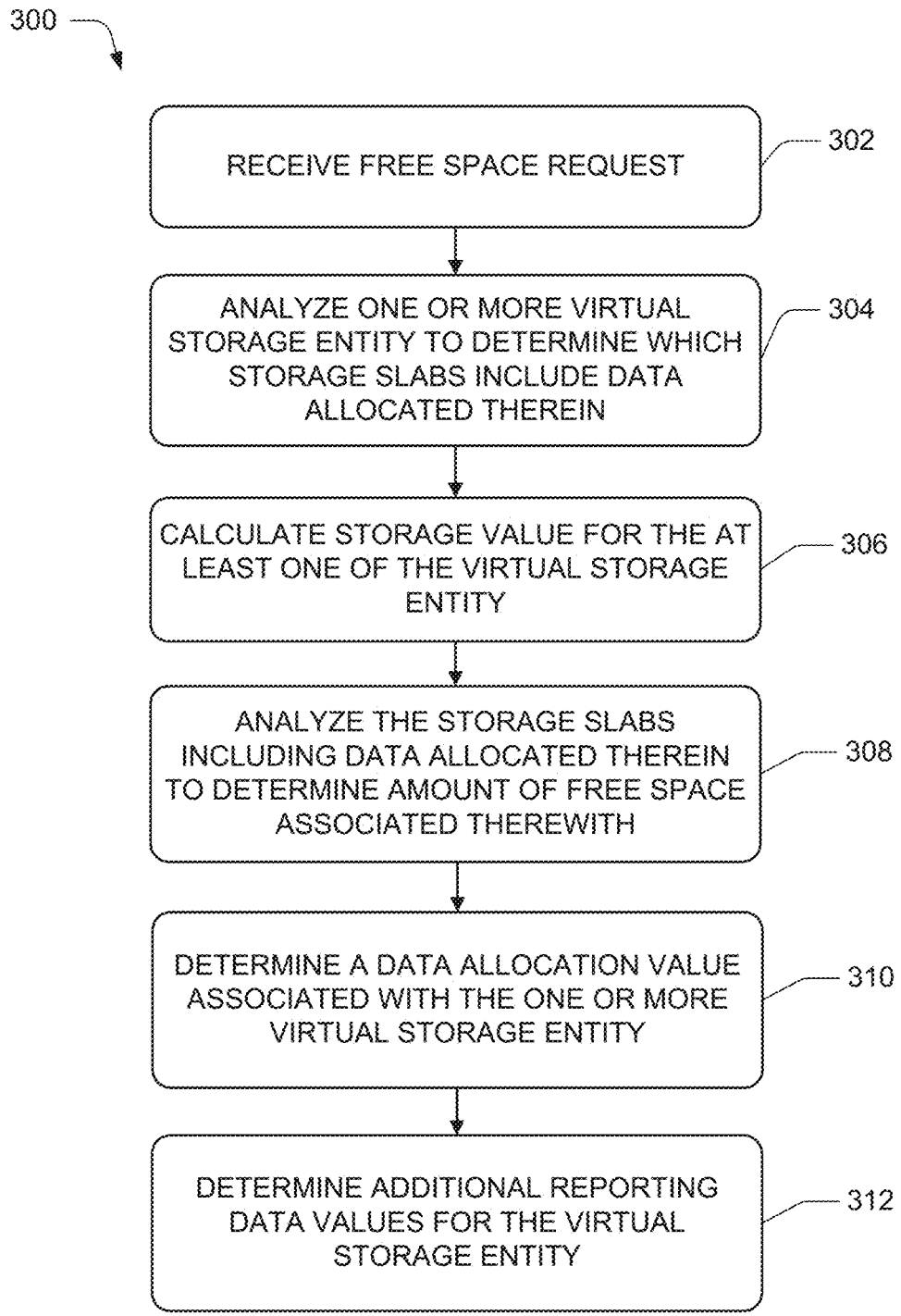
FIG. 3 illustrates exemplary aspects of a routine related to virtual storage free space management techniques.

Turning now to FIG. 3, aspects of a routine 300 related to the virtual storage free space management techniques are described. It should be understood that the operations of the methods (e.g., routines) disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims. Furthermore, it is to be understood that the routine 300 may be implemented by one or more of the elements illustrated in FIGS. 1-2 and FIGS. 4-5 and the related description of those figures.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The operations of the routine 300 are described herein as being implemented, at least in part, by an application, component and/or circuit, such as one or more of the operational elements of the computing environment 100. In some configurations, the computing environment 100 may implement at least the API 112, a compiled program, an interpreted program, a script or any other executable set of instructions. One or more of the implemented API 112, a compiled program, an interpreted program, a script, or other executable set of instructions may be executed by at least one processor to cause one or more of the operations of the routine 300 to operate.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 300 are described herein as being implemented, at least in part, by an application, component and/or circuit, such as the one or more of the elements associated with the computing environment 100. Although the following illustration may refer to the components or elements of FIGS. 1-2 and FIGS. 4-5 it can be appreciated that the operations of the routine 300 may also be implemented in many other ways. In addition, one or more of the operations of the routine 300 may alternatively or additionally be implemented, at least in part, by a chipset working alone or in conjunction with other software modules. Any service, circuit or application suitable for providing the techniques disclosed herein can be used in operations described herein.

At block 302, the computing environment 100 receives a request to determine the free space associated with a virtual storage entity 104. In some implementations, a software application operating within the computing environment 100 requests the free space value associated with the virtual storage entity 104. Alternatively, a software application operating external of the computing environment 100 may request the free space value associated with the virtual storage entity 104. The computing environment 100 may also receive a request to provide additional information data related to current storage and storage capacity associated with the virtual storage entity 104.

At block 304, the computing environment 100, by way of at least the storage module 110 and/or the API 112, analyzes the virtual storage entity 104 to determine which storage slabs 202 include data allocated therein. The computing environment 100 may access the virtual storage free space bitmap 208 to determine the storage slabs 202 that include data allocated therein. In some implementations, the computer environment 100 analyzes the virtual storage entity 104 or a plurality of virtual storage entities 104 to determine the storage slabs 202 that include data allocated therein. In some implementations, a software application requests the computer environment 100 to analyze one or more of the virtual storage entities 104 to determine which storage slabs 202 include data allocated therein.

At block 306, the computing environment 100 calculates a storage value for the virtual storage entity 104. The storage value is calculated by summing each storage slab byte value associated with the storage slabs 202 that were determined at block 304 to include data allocated therein. For example, suppose block 304 determined that there are seven storage slabs 202 that include data allocated therein, and each of the seven storage slabs 202 have a byte value of 1 GB. The storage value for the virtual storage entity 104 that includes the storage slabs 202 would be 7 GB.

At block 308, each of the storage slabs 202 that were determined at block 304 to include data allocated therein may be analyzed to determine if those storage slabs 202 include free space at the storage cluster level. Specifically, at block 308, the computing environment 100 accesses the virtual storage free space bitmap 208 to ascertain the amount of free space, at the cluster level, associated with each individual storage slab 202 found at block 304 to include data allocated therein. The ascertained amount of the free space, associated with each individual storage slab 202 found at block 304, may be summed together to provide the amount of free space across the storage slabs 202 that were determined at block 304 to include data allocated therein.

At block 310, a data allocation value associated with the virtual storage entity 104 is determined. In some implementations, the data allocation value is determined by subtracting the amount of free space across the storage slabs 202 that were determined at block 304 to include data allocated therein from the storage value calculated at block 306. The data allocation value associated with the virtual storage entity 104 represents the amount of data, in bytes for example, that is allocated on the virtual storage entity 104.

At block 312, additional reporting data values for the virtual storage entity 104 may be determined. From the foregoing, it is known that the virtual storage entity 104 stores an amount of data that is represented by the calculated data allocation value. The additional reporting data values that may be determined at block 312 include total storage, free space, real free space, externally allocated, and future expansion data values.

The total storage data value may be ascertained and reported by the storage management module 110. The total storage data value represents the maximum storage size, in bytes, of the virtual storage entity 104. For example, the maximum size of the virtual storage entity 104 illustrated in FIG. 2 is 50 GB.

The free space data value represents an amount of storage, in bytes, that is available to the virtual storage entity 104. The free space data value available to the virtual storage entity 104 is determined by accessing the physical storage free space bitmap 206 to ascertain the number of slabs 204 of the physical storage entity 106 that are not allocated to one or more of the virtual storage entities 104. Each of the slabs 204 may have a predetermined byte value. A total amount of free space, in bytes, associated with the unallocated slabs 204 of a corresponding physical storage entity 106 is found by summing the byte values associated with the unallocated slabs 204. However, this summed amount of free space does not account for the amount of free space across the storage slabs 202 that were determined at block 304 to include data allocated therein. Therefore, free space is found by summing the total amount of free space associated with the unallocated slabs 204 with the free space across the storage slabs 202, which were determined at block 304 to include data associated therewith. The free space across the storage slabs 202 is determined at block 308.

The size of the virtual storage entity 104 may be restricted by a quota value. The quota value may be a byte value. If a quota value exists, the real free space data value reflects the existence of the quota value. Therefore, the real free space data value is simply the free space data or the quota value, whichever is lesser.

The externally allocated data value reflects a storage amount, in bytes, that is consumed by other virtual storage entities 104 operating within the computing environment 100.

The future expansion data value reflects a physical storage amount, in bytes, that may be added to the computing environment 100 at some future time frame.

Figure 4:
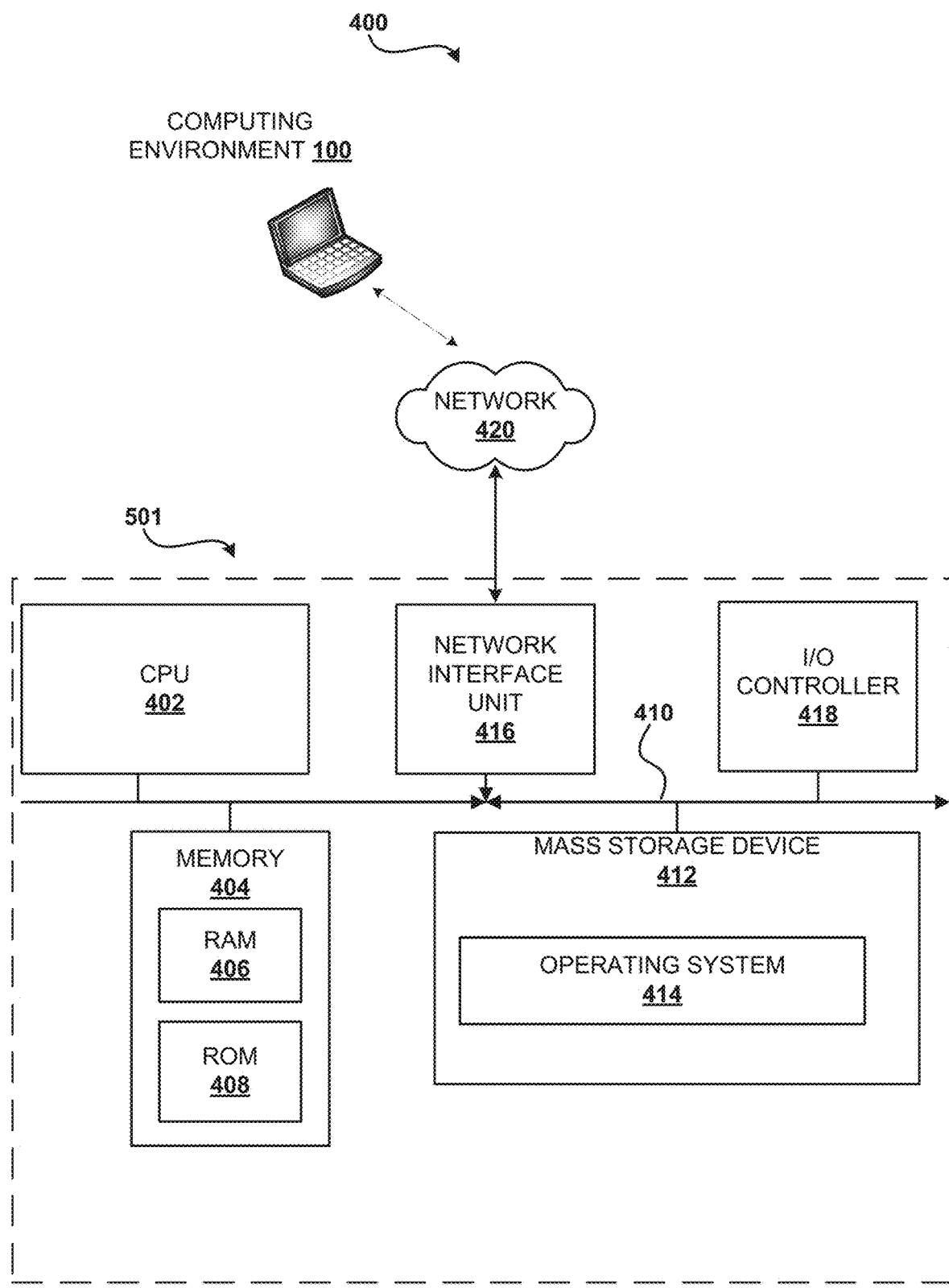
FIG. 4 shows additional details of an illustrative computer architecture for a computer capable of executing the herein described methods.

The computer architecture 400 illustrated in FIG. 4 includes a central processing unit 402 (processor or CPU), a system memory 404, including a random-access memory 406 (RAM) and a read-only memory (ROM) 408, and a system bus 410 that couples the memory 404 to the CPU 402. A basic input/output system containing the basic routines that help to transfer information between elements within the computer architecture 400, such as during startup, is stored in the ROM 408. The computer architecture 400 further includes a mass storage device 412 for storing an operating system 414, other data, and one or more application programs.

The mass storage device 412 is connected to the CPU 402 through a mass storage controller (not shown) connected to the bus 410. The mass storage device 412 and its associated computer-readable media provide non-volatile storage for the computer architecture 400. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 400. For purposes of the claims, the phrase "computer storage medium," "computer-readable storage medium" and variations thereof, does not include waves, signals, and/or other transitory and/or intangible communication media, per se.

According to various techniques, the computer architecture 400 may operate in a networked environment using logical connections to remote computers or computing environment(s) 100 through a network 420 and/or another network (not shown). For example, the network 420 may be the network 108. The computer architecture 400 may connect to the network 420 through a network interface unit 416 connected to the bus 410. It should be appreciated that the network interface unit 416 also may be utilized to connect to other types of networks and remote computer systems. The computer architecture 400 also may include an input/output controller 418 for receiving and processing input from a number of other devices, including a keyboard, mouse, or electronic stylus (not shown in FIG. 4). Similarly, the input/output controller 418 may provide output to a display screen, a printer, or other type of output device (also not shown in FIG. 4). It should also be appreciated that via a connection to the network 420 through a network interface unit 416, the computing architecture may enable the client computing environment 401 to communicate with the computing environment(s) 100.

It should be appreciated that the software components described herein may, when loaded into the CPU 402 and executed thereby, transform the CPU 402 and the overall computer architecture 400 from a general-purpose computing system into a special-purpose computing system customized to facilitate the functionality presented herein. The CPU 402 may be constructed from any number of transistors or other discrete circuit elements and/or chipset, which may individually or collectively assume any number of states. More specifically, the CPU 402 may operate as a finite-state machine, in response to executable instructions contained within the software modules disclosed herein. These computer-executable instructions may transform the CPU 402 by specifying how the CPU 402 transitions between states, thereby transforming the transistors or other discrete hardware elements constituting the CPU 402.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 400 in order to store and execute the software components presented herein. It also should be appreciated that the computer architecture 400 may include other types of computing devices, including hand-held computers, embedded computer systems, personal digital assistants, and other types of computing devices known to those skilled in the art. It is also contemplated that the computer architecture 400 may not include all of the components shown in FIG. 4, may include other components that are not explicitly shown in FIG. 4, or may utilize an architecture completely different than that shown in FIG. 4.

Computing system 400, described above, can be deployed as part of a computer network. In general, the above description for computing environments applies to both server computers and client computers deployed in a network environment.

Figure 5:
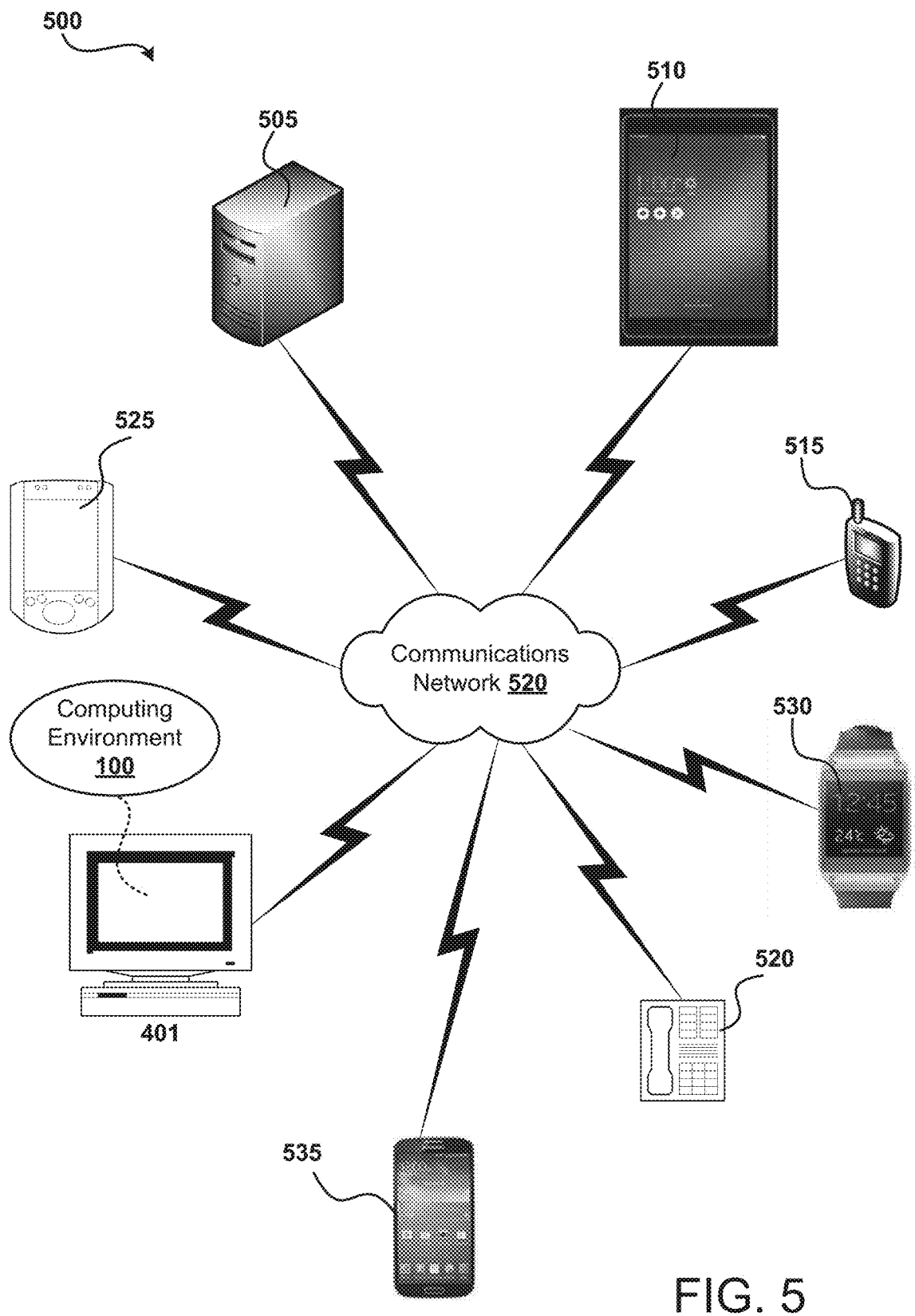
FIG. 5 shows additional details of illustrative computing devices cooperating in accordance with the herein described systems and methods.

FIG. 5 illustrates an exemplary illustrative networked computing environment 500, with a server in communication with client computers via a communications network, in which the herein described apparatus and methods may be employed. As shown in FIG. 5, server(s) 505 may be interconnected via a communications network 520 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing environments such as a tablet personal computer 510, a mobile telephone 515, a telephone 520, a personal computer(s), a personal digital assistant 525, a smart phone watch/personal goal tracker (e.g., Apple Watch, Samsung, FitBit, etc.) 530, and a smart phone 535. In a network environment in which the communications network 520 is the Internet, for example, server(s) 505 can be dedicated computing environment servers operable to process and communicate data to and from client computing environments 401, 510, 515, 520, 525, 530, and 535 via any of a number of known protocols, such as, hypertext transfer protocol (HTTP), file transfer protocol (FTP), simple object access protocol (SOAP), or wireless application protocol (WAP). Additionally, the networked computing environment 500 can utilize various data security protocols such as secured socket layer (SSL) or pretty good privacy (PGP). Each of the client computing environments 401, 510, 515, 520, 525, 530, and 535 can be equipped with computing environment 505 operable to support one or more computing applications or terminal sessions such as a web browser (not shown), or other graphical user interface (not shown), or a mobile desktop environment (not shown) to gain access to the server computing environment(s) 505.

Server(s) 505 may be communicatively coupled to other computing environments (not shown) and receive data regarding the participating user's interactions/resource network. In an illustrative operation, a user (not shown) may interact with a computing application running on a client computing environment(s) to obtain desired data and/or computing applications. The data and/or computing applications may be stored on server computing environment(s) 505 and communicated to cooperating users through client computing environments 401, 510, 515, 520, 525, 530, and 535, over an exemplary communications network 520. A participating user (not shown) may request access to specific data and applications housed in whole or in part on server computing environment(s) 505. These data may be communicated between client computing environments 401, 510, 515, 520, 525, 530, 535 and server computing environment(s) 505 for processing and storage. Server computing environment(s) 505 may host computing applications, processes and applets for the generation, authentication, encryption, and communication of data and applications and may cooperate with other server computing environments (not shown), third party service providers (not shown), network attached storage (NAS) and storage area networks (SAN) to realize application/data transactions.

The disclosure presented herein may be considered in view of the following examples.

Example 1. A system for virtual storage free space management, the system comprising: at least one processor; and at least one memory in communication with the at least one processor, the at least one memory having computer-executable instructions stored thereupon that, when executed by the at least one processor, cause the at least one processor to: analyze a virtual storage entity to determine a number of one or more storage slabs allocated with data, the one or more storage slabs associated with the virtual storage entity; calculate a data allocation value of the virtual storage entity based on the number of storage slabs allocated with data; analyze a physical storage entity to determine a storage allocation value associated with the physical storage entity, the physical storage entity providing physical data storage for one or more virtual storage entities; and determine a free space value associated with the virtual storage entity based on the storage allocation value and the data allocation value.

Example 2. The system according to Example 1, wherein the computer-executable instructions, when executed by the at least one processor, cause the processor to calculate the data allocation value by analyzing a free space bitmap associated with at least the number of one or more storage slabs allocated with data, the analyzing of the free space bitmap providing an amount of free space associated with at least the number of one or more storage slabs allocated with data.

Example 3. The system according to Example 2, wherein the computer-executable instructions, when executed by the at least one processor, cause the processor to calculate the data allocation value by determining a storage value associated with the number of storage slabs allocated with data and subtracting the amount of free space associated with at least the number of one or more storage slabs allocated with data from the storage value.

Example 4. The system according to Example 1, wherein the computer-executable instructions, when executed by the at least one processor, cause the processor to provide a real free space value associated with the virtual storage entity, the real free space value being less than or equal to the free space value.

Example 5. The system according to Example 4, wherein the free space value is limited by a quota storage value associated with the virtual storage entity, the quota storage value limiting an amount of storage space that the virtual storage entity may consume.

Example 6. The system according to Example 1, wherein the virtual storage entity is a thin provisioned storage entity.

Example 7. The system according to Example 1, wherein the computer-executable instructions, when executed by the at least one processor, cause the processor to analyze a physical storage free space bitmap indicating a number of slabs of the physical storage entity that are free of data, the analysis of the physical storage bitmap to provide the storage allocation value associated with the physical storage entity.

Example 8. A computer-readable storage medium having computer-executable instructions stored thereupon which, when executed by one or more processors of a computing device, cause the one or more processors of the computing device to: analyze a virtual storage entity to determine a number of one or more storage slabs allocated with data, the one or more storage slabs associated with the virtual storage entity; calculate a data allocation value of the virtual storage entity based on the number of storage slabs allocated with data; analyze a physical storage entity to determine a storage allocation value associated with the physical storage entity, the physical storage entity providing physical data storage for one or more virtual storage entities; and determine a free space value associated with the virtual storage entity based on the storage allocation value and the data allocation value.

Example 9. The computer-readable storage medium according to Example 8, wherein the computer-executable instructions, when executed by the one or more processors, cause the one or more processors to calculate the data allocation value by analyzing a free space bitmap associated with at least the number of one or more storage slabs allocated with data, the analyzing of the free space bitmap providing an amount of free space associated with at least the number of one or more storage slabs allocated with data.

Example 10. The computer-readable storage medium according to Example 9, wherein the computer-executable instructions, when executed by the one or more processors, cause the one or more processors to calculate the data allocation value by determining a storage value associated with the number of storage slabs allocated with data and subtracting the amount of free space associated with at least the number of one or more storage slabs allocated with data from the storage value.

Example 11. The computer-readable storage medium according to Example 8, wherein the computer-executable instructions, when executed by the one or more processors, cause the one or more processors to provide a real free space value associated with the virtual storage entity, the real free space value being less than or equal to the free space value.

Example 12. The computer-readable storage medium according to Example 11, wherein the free space value is limited by a quota storage value associated with the virtual storage entity, the quota storage value limiting an amount of storage space that the virtual storage entity may consume.

Example 13. The computer-readable storage medium according to Example 8, wherein the virtual storage entity is a thin provisioned storage entity.

Example 14. The computer-readable storage medium according to Example 8, wherein the computer-executable instructions, when executed by the one or more processors, cause the one or more processors to analyze a physical storage free space bitmap indicating a number of slabs of the physical storage entity that are free data, the analysis of the physical storage free space bitmap to provide the storage allocation value associated with the physical storage entity.

Example 15. A computing device, comprising: at least one processor; a computer-readable storage medium in communication with the at least one processor, the computer-readable storage medium having computer-executable instructions stored thereupon which, when executed by the at least one processor, cause the at least one processor to: receive a request at a free space application programming interface (API), the free space API configured to provide free space information related to at least one virtual storage entity; responsive to the request, the free space API to: analyze a virtual storage entity to determine a number of one or more storage slabs allocated with data, the one or more storage slabs associated with the virtual storage entity; calculate a data allocation value of the virtual storage entity based on the number of storage slabs allocated with data; analyze a physical storage entity to determine a storage allocation value associated with the physical storage entity, the physical storage entity providing physical data storage for one or more virtual storage entities; and determine a free space value associated with the virtual storage entity based on the storage allocation value and the data allocation value.

Example 16. The computing device according to Example 15, wherein the computer-executable instructions, when executed by the at least one processor, cause the at least one processor to calculate the data allocation value by analyzing a free space bitmap associated with at least the number of one or more storage slabs allocated with data, the analyzing of the free space bitmap providing an amount of free space associated with at least the number of one or more storage slabs allocated with data.

Example 17. The computing device according to Example 16, wherein the computer-executable instructions, when executed by the at least one processor, cause the at least one processor to calculate the data allocation value by determining a storage value associated with the number of storage slabs allocated with data and subtracting the amount of free space associated with at least the number of one or more storage slabs allocated with data from the storage value.

Example 18. The computing device according to Example 15, wherein the computer-executable instructions, when executed by the at least one processor, cause the at least one processor to provide a real free space value associated with the virtual storage entity, the real free space value being less than or equal to the free space value.

Example 19. The computing device according to claim 18, wherein the free space value is limited by a quota storage value associated with the virtual storage entity, the quota storage value limiting an amount of storage space that the virtual storage entity may consume.

Example 20. The computing device according to Example 15, wherein the computer-executable instructions, when executed by the at least one processor, cause the at least one processor to analyze a physical storage free space bitmap indicating a number of slabs of the physical storage entity that are free data, the analysis of the physical storage free space bitmap to provide the storage allocation value associated with the physical storage entity.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A system for virtual storage free space management, the system comprising:
   at least one processor; and
   at least one memory in communication with the at least one processor, the at least one memory having computer-executable instructions stored thereupon that, when executed by the at least one processor, cause the at least one processor to:
      analyze a virtual storage entity to determine a number of storage slabs allocated with data, wherein each of the storage slabs is associated with the virtual storage entity and has a predetermined byte value representing a storage amount of an individual storage slab;
      calculate a data allocation value of the virtual storage entity based on a sum of the predetermined byte values of each of the storage slabs allocated with data;
      analyze a physical storage entity to determine a physical storage allocation value that is a byte value of storage slabs of the physical storage entity allocated to the virtual storage entity; and
      determine a free space value associated with the virtual storage entity based on the physical storage allocation value and the data allocation value.

2. The system according to claim 1, wherein the computer-executable instructions, when executed by the at least one processor, cause the processor to:
   analyze a free space bitmap that tracks free space in the storage slabs allocated with data to identify an amount of cluster-level free space within the storage slabs allocated with data; and
   wherein the data allocation value of the virtual storage entity is further based on the amount of cluster-level free space.

3. The system according to claim 2, wherein the data allocation value is further based on a difference between the amount of cluster-level free space and the sum of the predetermined byte value of each of the storage slabs allocated with data.

4. The system according to claim 1, wherein the computer-executable instructions, when executed by the at least one processor, cause the processor to provide a real free space value associated with the virtual storage entity, the real free space value being less than or equal to the free space value.

5. The system according to claim 4, wherein the real free space value is limited by a quota storage value associated with the virtual storage entity, the quota storage value limiting an amount of storage space that the virtual storage entity may consume.

6. The system according to claim 1, wherein the virtual storage entity is a thin provisioned storage entity.

7. The system according to claim 1, wherein the computer-executable instructions, when executed by the at least one processor, cause the processor to analyze a physical storage free space bitmap indicating a number of slabs of the physical storage entity that are unallocated, the analysis of the physical storage bitmap to provide the physical storage allocation value associated with the physical storage entity.

8. A computer-readable storage medium having computer-executable instructions stored thereupon which, when executed by one or more processors of a computing device, cause the one or more processors of the computing device to:
   analyze a virtual storage entity to determine a number of storage slabs allocated with data, wherein each of the storage slabs is associated with the virtual storage entity and has a predetermined byte value representing a storage amount of an individual storage slab;
   calculate a data allocation value of the virtual storage entity based on a sum of the predetermined byte values of each of the storage slabs allocated with data;
   analyze a physical storage entity to determine a physical storage allocation value that is a byte value of storage slabs of the physical storage entity allocated to the virtual storage entity; and
   determine a free space value associated with the virtual storage entity based on the physical storage allocation value and the data allocation value.

9. The computer-readable storage medium according to claim 8, wherein the computer-executable instructions, when executed by the one or more processors, cause the one or more processors to:
   analyze a free space bitmap that tracks free space in the storage slabs allocated with data to identify an amount of cluster-level free space within the storage slabs allocated with data; and
   wherein the data allocation value of the virtual storage entity is further based on the amount of cluster-level free space.

10. The computer-readable storage medium according to claim 9, wherein the data allocation value is further based on a difference between the amount of cluster-level free space and the sum of the predetermined byte value of each of the storage slabs allocated with data.

11. The computer-readable storage medium according to claim 8, wherein the computer-executable instructions, when executed by the one or more processors, cause the one or more processors to provide a real free space value associated with the virtual storage entity, the real free space value being less than or equal to the free space value.

12. The computer-readable storage medium according to claim 11, wherein the real free space value is limited by a quota storage value associated with the virtual storage entity, the quota storage value limiting an amount of storage space that the virtual storage entity may consume.

13. The computer-readable storage medium according to claim 8, wherein the virtual storage entity is a thin provisioned storage entity.

14. The computer-readable storage medium according to claim 8, wherein the computer-executable instructions, when executed by the one or more processors, cause the one or more processors to analyze a physical storage free space bitmap indicating a number of slabs of the physical storage entity that are free data, the analysis of the physical storage free space bitmap to provide the physical storage allocation value associated with the physical storage entity.

15. A computing device, comprising:
   at least one processor; and
   a computer-readable storage medium in communication with the at least one processor, the computer-readable storage medium having computer-executable instructions stored thereupon which, when executed by the at least one processor, cause the at least one processor to:
      receive a request at a free space application programming interface (API), the free space API configured to provide free space information related to at least one virtual storage entity; and
      responsive to the request:
         analyze a virtual storage entity to determine a number of storage slabs allocated with data, wherein each of the storage slabs is associated with the virtual storage entity and has a predetermined byte value representing a storage amount of an individual storage slab;
         calculate a data allocation value of the virtual storage entity based on a sum of the predetermined byte values of each of the storage slabs allocated with data;
         analyze a physical storage entity to determine a physical storage allocation value that is a byte value of storage slabs of the physical storage entity allocated to the virtual storage entity; and
         determine a free space value associated with the virtual storage entity based on the physical storage allocation value and the data allocation value.

16. The computing device according to claim 15, wherein the computer-executable instructions, when executed by the at least one processor, cause the at least one processor to:
   analyze a free space bitmap that tracks free space in the storage slabs allocated with data to identify an amount of cluster-level free space within the storage slabs allocated with data; and
   wherein the data allocation value of the virtual storage entity is further based on the amount of cluster-level free space.

17. The computing device according to claim 16, wherein the data allocation value is further based on a difference between the amount of cluster-level free space and the sum of the predetermined byte value of each of the storage slabs allocated with data.

18. The computing device according to claim 15, wherein the computer-executable instructions, when executed by the at least one processor, cause the at least one processor to provide a real free space value associated with the virtual storage entity, the real free space value being less than or equal to the free space value.

19. The computing device according to claim 18, wherein the real free space value is limited by a quota storage value associated with the virtual storage entity, the quota storage value limiting an amount of storage space that the virtual storage entity may consume.

20. The computing device according to claim 15, wherein the computer-executable instructions, when executed by the at least one processor, cause the at least one processor to analyze a physical storage free space bitmap indicating a number of slabs of the physical storage entity that are free data, the analysis of the physical storage free space bitmap to provide the physical storage allocation value associated with the physical storage entity.

* * * * *